US012577878B2

(12) United States Patent
Aitchison et al.

(10) Patent No.: US 12,577,878 B2
(45) Date of Patent: Mar. 17, 2026

(54) LEADING EDGE PLATING ON LOW PRESSURE COMPRESSOR VANE FOR WEIGHT AND STRENGTH OPTIMIZATION

(71) Applicant: Pratt & Whitney Canada Corp., Longueuil (CA)

(72) Inventors: Paul Aitchison, Hamilton (CA); Muthukumar Mathivanan, North York (CA); Anthony Brown, Mississauga (CA); Tammy Yam, Richmond Hill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/632,841

(22) Filed: Apr. 11, 2024

(65) Prior Publication Data

US 2025/0320822 A1 Oct. 16, 2025

(51) Int. Cl.
*F01D 5/14* (2006.01)
*F01D 5/28* (2006.01)

(52) U.S. Cl.
CPC ............ *F01D 5/147* (2013.01); *F01D 5/141* (2013.01); *F01D 5/282* (2013.01); *F05D 2230/31* (2013.01)

(58) Field of Classification Search
CPC .... F04D 29/324; F04D 29/023; F04D 29/388; F04D 29/542; F04D 29/38; F05D 2240/303; F05D 2220/36; F05D 2300/603; F05D 2230/23; F05D 2240/121; F05D 2300/614; F05D 2220/32; F05D 2230/10; F05D 2300/133; F05D 2300/173; F05D 2300/174; F05D 2230/232; F05D 2230/234; F05D 2230/60; F05D 2230/80; F05D 2240/307; F05D 2260/95; F05D 2300/10; F05D 2230/30; F05D 2230/31; F05D 2230/312; F05D 2230/50; F05D 2230/90; F05D 2240/30; F05D 2240/305;
(Continued)

(56) References Cited

U.S. PATENT DOCUMENTS

| | | | |
|---|---|---|---|
| 3,564,689 | A | 2/1971 | Hirtenlechner |
| 6,241,469 | B1 | 6/2001 | Beeck et al. |

(Continued)

FOREIGN PATENT DOCUMENTS

| | | | |
|---|---|---|---|
| EP | 3985227 | A2 | 4/2022 |
| FR | 3121475 | A1 | 10/2022 |
| WO | 9907981 | A1 | 2/1999 |

OTHER PUBLICATIONS

Extended European Search Report issued in European Patent Application No. 25169507.8; Date of Mailing Aug. 22, 2025 (8 pages).

*Primary Examiner* — Eric J Zamora Alvarez
(74) *Attorney, Agent, or Firm* — CANTOR COLBURN LLP

(57) ABSTRACT

A vane including an airfoil body extending from a root to a tip defining a longitudinal axis therebetween, wherein the airfoil body includes a leading edge between the root and the tip. The vane includes a pressure side and a suction side and a recess area on the leading edge. The recess area includes a pressure side recess area and a suction side recess area, and a metal is deposited on the recess area. A method of manufacturing the vane and a gas turbine engine including the vane are also disclosed.

15 Claims, 4 Drawing Sheets

(58) Field of Classification Search

CPC ...... F05D 2300/17; F01D 5/147; F01D 5/282; F01D 5/288; F01D 5/28; F01D 5/005; F01D 5/286; F01D 25/007; F01D 5/02; F01D 5/141; F01D 5/18

See application file for complete search history.

(56) References Cited

U.S. PATENT DOCUMENTS

| | | | | |
|---|---|---|---|---|
| 8,137,073 | B2 * | 3/2012 | Giusti | F04D 29/324 416/224 |
| 9,784,112 | B2 * | 10/2017 | Briend | F01D 25/005 |
| 9,828,860 | B2 * | 11/2017 | Schreiber | F01D 5/282 |
| 9,920,631 | B2 * | 3/2018 | Tellier | F04D 29/541 |
| 9,964,117 | B2 * | 5/2018 | Schreiber | F01D 5/147 |
| 10,760,447 | B1 * | 9/2020 | Edwards | F02C 3/06 |
| 10,815,797 | B2 | 10/2020 | Karlen et al. | |
| 10,934,851 | B2 * | 3/2021 | Guivarc'h | F01D 5/147 |
| 11,286,782 | B2 * | 3/2022 | Gemeinhardt | F01D 5/147 |
| 11,352,891 | B2 | 6/2022 | Barnett | |
| 2009/0077802 | A1 * | 3/2009 | Moroso | B29C 45/14311 29/889.71 |
| 2011/0129600 | A1 | 6/2011 | Das et al. | |
| 2017/0009592 | A1 | 1/2017 | Obuchi et al. | |
| 2017/0205281 | A1 * | 7/2017 | Cassaigne | F25D 19/006 |
| 2017/0274403 | A1 * | 9/2017 | Miki | F01D 25/00 |
| 2018/0045216 | A1 | 2/2018 | Karlen et al. | |
| 2020/0191001 | A1 * | 6/2020 | Okabe | F01D 5/282 |

* cited by examiner

LEADING EDGE PLATING ON LOW PRESSURE COMPRESSOR VANE FOR WEIGHT AND STRENGTH OPTIMIZATION

TECHNICAL FIELD

The present disclosure relates to airfoils and manufacturing of airfoils, and more particularly low pressure compressor vanes.

BACKGROUND

Airfoils can be assembled by combining a leading edge sheath with an airfoil body (e.g., blade). Typically, the leading edge sheath is a metallic material that is bonded to the airfoil body. Bonding of the sheath can be time consuming and fit can be challenging leading to increased manufacturing costs. Additional challenges in the design and manufacturing of airfoils include the need for robust airfoils capable of withstanding erosion, abrasion, and impact from foreign objects.

Thus, a need remains for vanes with reduced weight, maintained strength capability, and aerodynamic performance.

SUMMARY

A vane comprises an airfoil body extending from a root to a tip defining a longitudinal axis therebetween. The airfoil body includes a leading edge between the root and the tip, and a pressure side and a suction side and a recess area on the leading edge. The recess area includes a pressure side recess area and a suction side recess area, and a deposited metal on the recess area.

In one aspect, the deposited metal is directly on the recess area.

In another aspect, an outer surface of the deposited metal on the recess area is flush with an outer surface of the airfoil body.

In yet another aspect, the deposited metal includes aluminum, copper, nickel, titanium, iron, chromium, or a combination thereof.

In yet another aspect, the deposited metal on the suction side recess area has a surface roughness of less than or equal to 40 microinches for the arithmetic average roughness (Ra).

In yet another aspect, the airfoil body is a fiber-reinforced composite material, a metal of a density equal to or less than a density of the deposited metal, or a combination thereof.

In yet another aspect, the exposed surface area of the deposited metal on the suction side recess area is greater than the exposed surface area of the deposited metal on the pressure side recess area.

In yet another aspect, the recess area has a variable thickness or a uniform thickness.

In yet another aspect, the recess area has a thickness of 0.001 inch (0.03 mm) to 0.015 inch (0.4 mm).

In yet another aspect, a shape of the suction side recess area includes a suction side edge and the suction side edge is parallel to the leading edge.

In yet another aspect, a shape of the pressure side recess area comprises a pressure side edge and the pressure side edge is parallel to the leading edge.

In yet another aspect, at least one of the suction side edge and the pressure side edge is not parallel to the leading edge.

In yet another aspect, the pressure side recess area comprises a pressure side edge wall and a pressure side base surface and the suction side recess area comprises a suction side edge wall and a suction side base surface. An angle between the pressure side edge wall and the pressure side base surface and an angle between the suction side edge wall and the suction side base surface are different.

A gas turbine engine including the vane.

In one aspect, the recess area of the vane of the gas turbine engine is shaped to increase the stiffness of the vane to tune a frequency of the gas turbine engine.

A method of manufacturing a vane including selecting a shape and a location of a recess area on a leading edge of an airfoil body based on modeling a probability for impact with a foreign object, a frequency of a system comprising the vane, or a combination thereof. The airfoil body is provided and extends from a root to a tip defining a longitudinal axis therebetween. The airfoil body includes the leading edge between the root and the tip and the airfoil body includes a pressure side and a suction side. A metal is deposited on the recess area.

In one aspect, the shape and the location of the recess area are selected to increase stiffness to tune the frequency of the system to a desired value.

In another aspect, the method further includes minimizing the recess area to reduce the weight of the deposited metal by modeling the probability for impact with a foreign object to select the shape and the location of the recess area.

In yet another aspect, the airfoil includes a pressure side and a suction side and a recess area on the leading edge, and wherein the weight of the airfoil is optimized by depositing metal on a surface area less than the total surface area of the pressure side.

In yet another aspect, the metal is deposited by electrodeposition.

BRIEF DESCRIPTION OF THE FIGURES

Referring now to the figures, which are exemplary embodiments, and wherein the like elements are numbered alike.

DETAILED DESCRIPTION

Disclosed herein is a vane comprising an airfoil body with a recess area on the leading edge. The recess area with metal deposited therein can be designed to provide erosion protection while minimizing the weight of the vane, increase stiffness for frequency tuning for non-integral vibration (NIV) to improve component life, and provide strength on areas of the vane with a high ballistic probability of foreign object impact. The metal can be deposited to provide a smooth, flush surface with the airfoil body to improve aerodynamic performance. The vane can be used in a gas turbine engine such as a vane for a low pressure compressor, as a hydraulic vanes on a watercraft, a vane in a hydraulic pumps, and so forth. The deposited metal of the vane can serve as a wear surface. When the deposited metal of the vane is worn, the vane design can facilitate refurbishment. A method of manufacturing the vane includes depositing a metal in a recess area in an airfoil body in a manner designed to optimize for erosion protection, minimal weight, frequency tuning, and improved strength.

The exemplary embodiments disclosed herein are illustrative of a vane designed to minimize weight of the vane, increase stiffness for frequency tuning, and provide strength on areas of the vane with a high ballistic probability of foreign object impact, use of the vane in a gas turbine engine, and a method of manufacture of the vane. It should be understood, however, that the disclosed embodiments are merely examples of the present disclosure, which may be embodied in various forms. Therefore, details disclosed herein with reference to example vanes and turbine assemblies and associated processes/techniques of fabrication/assembly and use are not to be interpreted as limiting, but merely as the basis for teaching one skilled in the art how to make and use the vane of the present disclosure.

Figure 1:
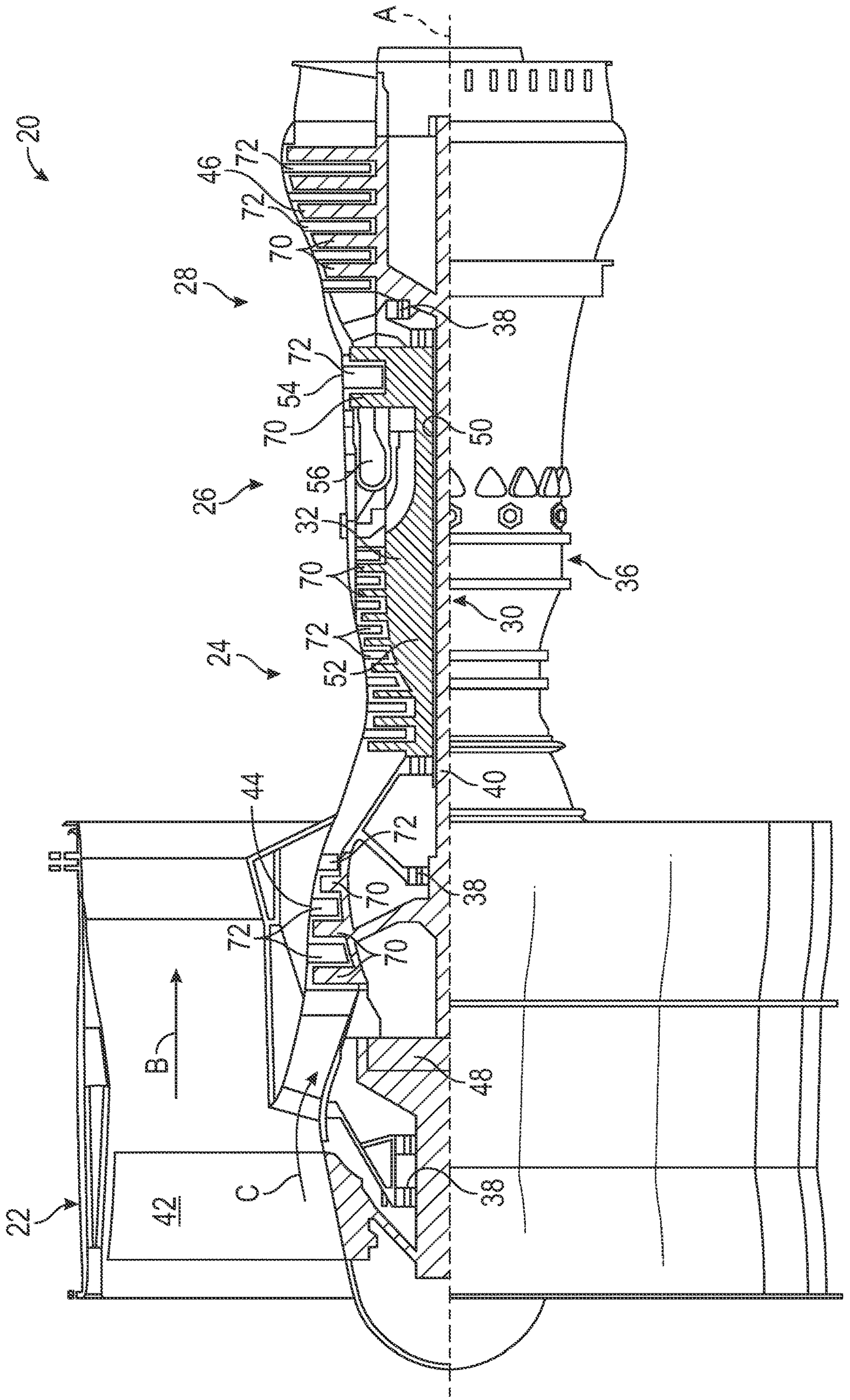
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use of a vane with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The compressor sections 44 and 52 include rotating blade stages 70 and intermediate vane or stator assemblies 72. Both of these structures are shown schematically. It is known that the blades of the blade stages 70 typically rotate with a rotor. The vane or stator assemblies 72 are typically provided in the form of a ring, with vanes extending radially between an inner shroud and an outer shroud. In one embodiment, the ring may be formed from a plurality of stator segments that are circumferentially aligned with each other to form the vane or stator assembly 72. As illustrated, the turbine sections 44 and 46 also have blade stages 70 and vane or stator assemblies 72.

The engine 20 may include one or more vanes 100 as disclosed herein. Vane 100 may be of a type known as a “guide vane” or “stator vane” that are used to direct fluid flow toward a desired direction so as to be received into downstream rotor blades at a desired angle for example. In some embodiments, vane 100 may be suitable for installation in a core gas path of engine 20. For example, vane 100 may be an (e.g., variable orientation) inlet guide vane disposed upstream of compressor 44. Vane 100 may instead be disposed between two rotor stages of compressor 44. In various embodiments, vane 100 may have a fixed orientation within engine 20 or may have a controllably variable orientation within engine 20. The vane 100 as disclosed herein is not limited to use in a geared turbo fan engine as shown and the vane 100 may be used in any gas turbine engine system.

Figure 2A:
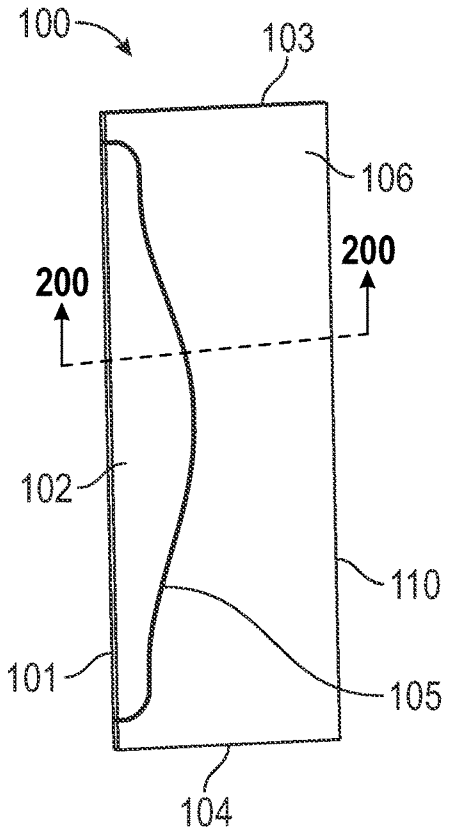
FIGS. 2A to 2B are schematic perspective views of an embodiment of a vane.
Figure 2B:
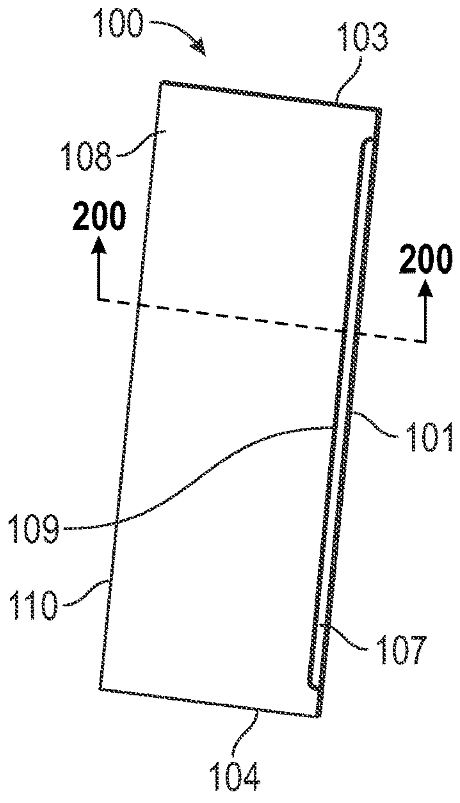

A schematic perspective view of an embodiment of a vane 100 is shown in FIGS. 2A to 2B. The vane 100 includes a leading edge 101 and trailing edge 110. The suction side of the vane is presented in FIG. 2A. The root 104 and tip 103 of the vane 100 define a longitudinal axis therebetween with a suction side recess area 102 between the root 104 and the tip 103, along the leading edge 101. The suction side edge 105 of the suction side recess area 102 can be substantially parallel to the leading edge 101 or shaped in a manner designed to accommodate the probability of foreign body object impact on the suction side of the vane or to accommodate frequency tuning. Metal is deposited in the suction side recess area 102 to protect and strengthen the leading edge 101 of the vane 100. As shown in FIG. 2A, a surface airfoil body is exposed on the suction side and labeled as 106. The surface of the suction side includes the airfoil body surface 106 and the surface of the deposited metal in the suction side recess area 102. FIG. 2B provides a perspective view of the pressure side of the vane 100. The exposed surface of the airfoil body on the pressure side is labeled as 108. Metal is deposited in the pressure side recess area 107 to protect and strengthen the leading edge 101. The pressure side edge 109 of the pressure side recess area 107 can be substantially parallel to the leading edge 101 or shaped in a manner designed to accommodate the probability of foreign object impact on the pressure side of the vane or to accommodate frequency tuning. The surface of the pressure side includes the exposed airfoil body surface 108 and the surface of the deposited metal on the pressure side recess area 107. In some embodiments, at least one of the suction side edge 105 and the pressure side edge 109 is not parallel to the leading edge.

Figure 2C:
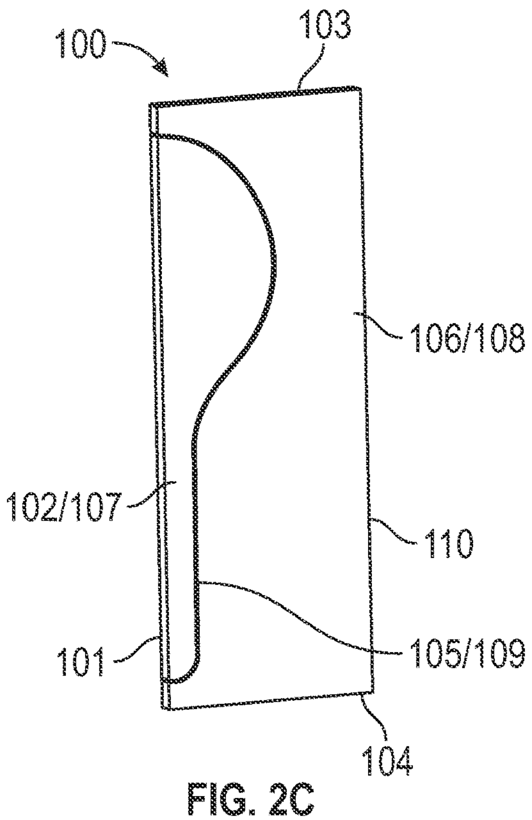
FIG. 2C is a schematic perspective view of an embodiment of a vane.

FIG. 2C provides a perspective view of an embodiment of the vane 100. Both the suction side and the pressure side can be represented by the view in FIG. 2C. as indicated by the numerals numbered alike for the suction side/pressure side (i.e., 102/107; 106/108; and 105/109). As shown in FIG. 2C, the shape of the recess area 102/107 for the deposited metal can be tailored to increase stiffness for foreign object debris (FOD) impact and/or frequency tuning.

Figure 3A:
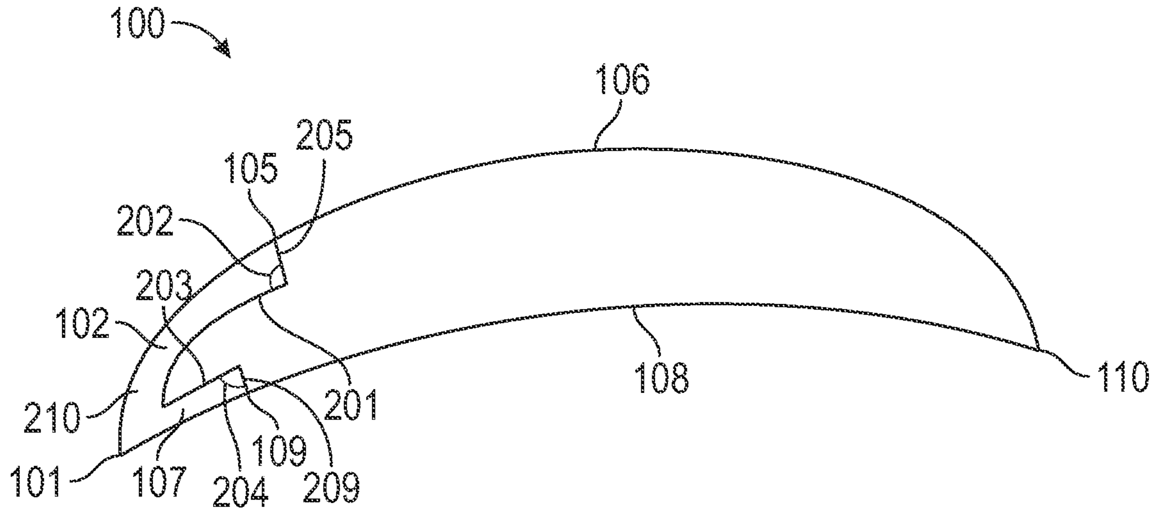
FIGS. 3A to 3B are a schematic cross-sectional view of the vane of FIGS. 2A and 2B taken along line 200-200 of FIGS. 2A and 2B.
Figure 3B:
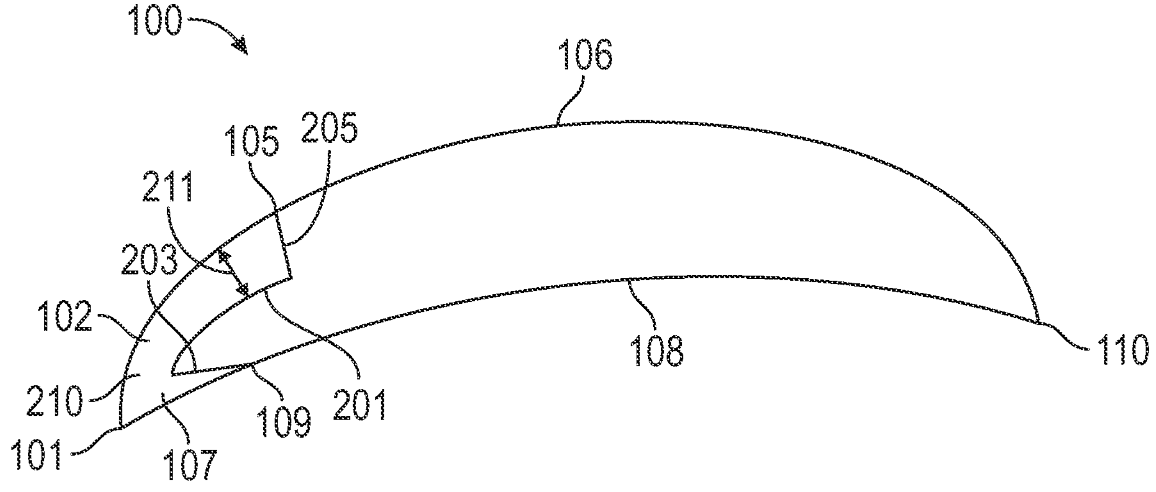

FIGS. 3A to 3B are schematic cross-sectional views of embodiments of the vane of FIGS. 2A to 2B taken along line 200-200 of FIGS. 2A to 2B. As shown in FIG. 3A, the profile of the recess area 210 includes the suction side recess area 102 and the pressure side recess area 107 as wrapped around the leading edge 101. The suction side edge 105 is the exposed edge of the suction side recess area 102 and exposed surface of the air foil body surface 106. The suction side recess area 102 can include a suction side edge wall 205 defining a boundary between the metal deposited in the recess area and the air foil body on the suction side and a thickness of the suction side recess area. The suction side recess area 102 also comprises a suction side base surface 201. An angle between the suction side edge wall 205 and the suction side base surface 201 can be an angle between 90°, less than 90°, or greater than 90°. When the angle is greater than 90°, the suction side recess area 102 tapers down to the airfoil body. That is, when the suction side recess area 102 tapers down to the airfoil body surface 106, the thickness of the recess area decreases to zero. In some embodiments, the suction side edge wall 205 is absent and the depth of the suction side base surface 201 decreases towards the airfoil body surface 106 to taper the recessed area to the suction side edge 105.

The pressure side edge 109 is the exposed edge of the pressure side recess area 107 and exposed pressure side surface of the air foil body surface 108. The pressure side recess area 107 can include a pressure side edge wall 209 defining a boundary between the metal deposited in the recess area and the air foil body on the pressure side and a thickness of the pressure side recess area. The pressure side recess area 107 also comprises a pressure side base surface 203. An angle between the pressure side edge wall 209 and the pressure side base surface 203 can be an angle between 90°, less than 90°, or greater than 90°. When the angle is greater than 90°, the pressure side recess area 107 tapers down to the airfoil body. That is, when the suction side recess area 107 tapers down to the airfoil body surface 108, the thickness of the recess area decreases to zero. In some embodiments, the pressure side edge wall 209 is absent and the depth of the pressure side base surface 203 decreases towards the airfoil body surface 108 to taper the recessed area to the pressure side edge 109 (as shown in FIG. 3B).

In some embodiments, an angle 204 between the pressure side edge wall 209 and the pressure side base surface 203 can be the same or different as an angle 202 between the suction side edge wall 205 and the suction side base surface 201. That is the profile of the boundary between the suction side recess area 102 and the airfoil body 106 can be the same or different as the profile of the boundary between the pressure side recess area 107 and the air foil body 108.

The airfoil body can be a fiber-reinforced composite material, a metal of a density equal to or less than a density of the deposited metal, or a combination thereof. A metal can be deposited on the recess area of the airfoil body. The metal can comprise aluminum, copper, nickel, titanium, iron, chromium, or a combination thereof. For example, the metal can comprise a stainless steel alloy. The metal can comprise a plurality of layers, wherein the layers comprise alternating materials. In some embodiments, the metal is a monolithic material. The metal can have an exposed surface roughness of less than or equal to 40 microinches or less than or equal to 35 microinches for the arithmetic average roughness (Ra). The exposed surface of the metal can be flush with the surface of the airfoil body to improve aerodynamic performance.

The surface area of the deposited metal disposed on the suction side recess area 102 can be the same or greater than the surface area of the deposited metal disposed on the pressure side recess area 107. In some embodiments, it may be preferable for the surface area of the deposited metal disposed on the suction side recess area 102 to be greater than the surface area of the deposited metal disposed on the pressure side recess area 107, to provide minimal weight with increased protection of the suction side from foreign object impact. The thickness 211 of the metal in the recess area 210 can be uniform or variable. In some embodiments, the thickness of the deposited metal disposed on the suction side recess area 102 is the same or different than the thickness of the deposited metal disposed on the pressure side recess area 107. The deposited metal disposed on the recess area can have a thickness of 0.001 inch (0.03 mm) to 0.015 inch (0.4 mm), of 0.012 inch (0.3 mm), of 0.008 inch (0.2 mm), or of 0.010 inch (0.25 mm), or a thickness therebetween.

In some embodiments, the recess area of the vane can be shaped in order to minimize weight and optimize protection of the vane from foreign object impact. The shape of the suction side recess area can include regions of the suction side surface with a greater ballistic probability for impact with a foreign object. The ballistic modeling of probability can be performed using mathematical methods considering the impact location and probability of impact based on fan speed, component geometry, and projectile speed. Modeling of the probability of impact with a foreign object, can ensure sufficient protection of the suction side recess area and leading edge, while minimizing the amount of deposited metal on the pressure side of the vane. The weight of the airfoil can be optimized by providing a recess area that has a surface area less than the total surface area of the pressure side and depositing metal on the recess area. For example, the surface area of the pressure side recess area can be less than 50%, less than 25%, less than 10%, less than 5%, or less than 1% of the total surface area of the pressure side to minimize weight of the vane. The recess area of the vane can also be shaped in order for the deposited metal to provide optimized stiffness to the vane for frequency tuning.

In an embodiment, a gas turbine engine 20 comprises the vane 100. The recess area of the vane can be shaped to increase the stiffness of the vane to tune a frequency of the gas turbine engine. The recess area of the vane can be shaped to minimize the weight of the vane in the gas turbine engine. The recess area of the vane can be shaped to optimize protection of the vane from foreign object impact.

Figure 5:
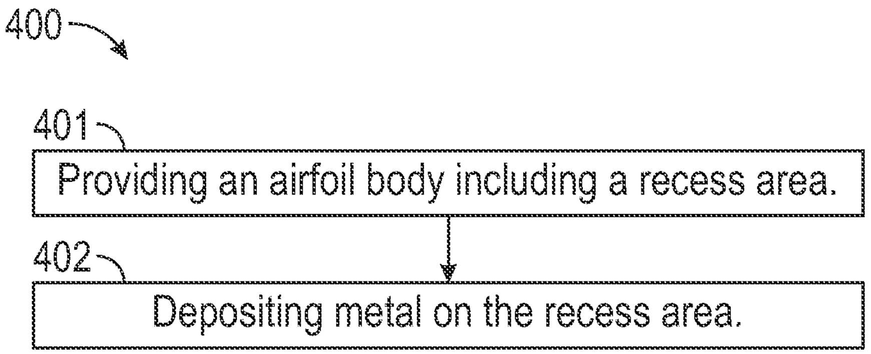
FIG. 5 is a flowchart of an embodiment of a method of manufacturing a vane.

A method 400 of manufacturing a shown in a flowchart in FIG. 5. The method 400 can comprise provide an airfoil body with a recess area (step 401) followed by depositing metal on the recess area (step 402). The method 400 can include modeling by various mathematic formulae to tailor the shape and location of the recess area. Tailoring of the shape and location of the recess area can minimize the weight of the vane, protect areas with high probability of foreign object impact, add stiffness for frequency tuning, and so forth.

Figure 4:
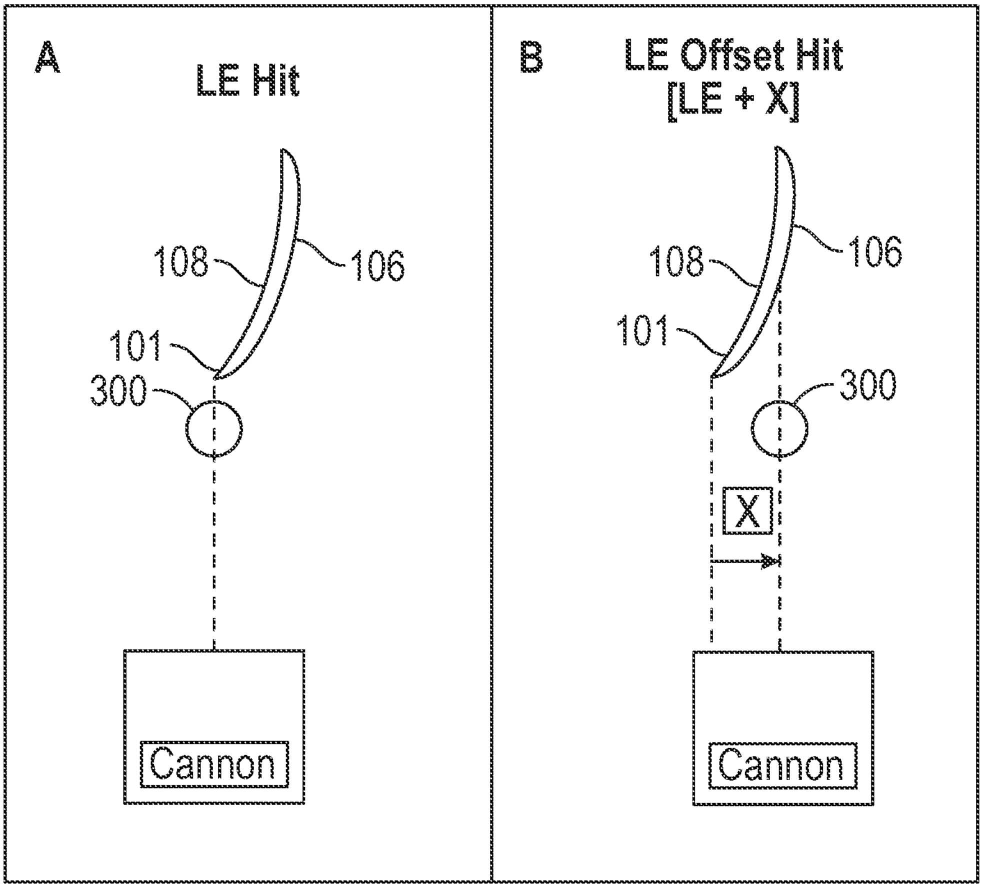
FIGS. 4A to 4B are schematic side views of foreign object impact on an embodiment of a vane.

The method 400 can include modeling a ballistic probability for impact with a foreign object in order to select a shape and a location of the recess area. The shape and the location of the recess area can selected to include the locations on the vane with a greater probability for impact with a foreign object. The probability of impact can be mathematically modeled from a ballistic model to calculate the probability of impact with a foreign object considering the impact location and probability of impact based on fan speed, component geometry, and projectile speed. FIGS. 4A and 4B provide schematic side views of foreign object impact on an embodiment of a vane. In FIG. 4A, a direct impact of an object 300 on the leading edge 101 is shown (LE Hit). In FIG. 4B, an offset hit of the leading edge 101 by the object 300 is shown for an offset of X onto the surface of the suction side (LE Offset Hit). The force of the impact and probability of impact can be taken into consideration within the mathematical model to provide an optimized shape for the recessed area on the suction side of the vane while also minimizing the weight of the deposited metal. In an embodiment, the recess area can be minimized to reduce the weight of the vane by depositing metal on less than 50%, less than 25%, or less than 10% of the total surface area of the pressure side.

The method 400 can apply a mathematical model for a frequency of a system, which comprises the vane. The frequency mathematical model can take into consideration the non-integral vibration (NIV), dynamics and aerodynamics analysis of the system. The modeled frequency of the system can be used to select a shape and a location of the recess area to selectively increase the stiffness of the vane in order to tune the frequency of the system to a targeted value.

The method can include selecting a shape and a location of a recess area on a leading edge of an airfoil body based on modeling a probability for impact with a foreign object, a frequency of a system comprising the vane, or a combination thereof.

The metal can be deposited on the airfoil body by electrodeposition (e.g., electroplating), bonding of the metal by compression molding, and so forth. Electrodeposition of the metal can include electroforming or electroplating. The use of electrodeposition can accelerate the manufacturing process, improve fit of the deposited metal to the airfoil body, and can more readily accommodate customization of the deposited metal shape. In some embodiments, the surface is treated and prepared prior to electrodeposition of the metal.

It is noted that the vanes, assemblies, and methods of the present disclosure can provide weight optimized vanes with maintained strength capability. The use of vanes in systems such as gas turbine engines can improve the aerodynamic performance of a system while providing protection of the vane from foreign object impact, thus extending the service and life of the vane.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," and so forth). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the vanes, assemblies, and methods of the present disclosure have been described with reference to example embodiments thereof, the present disclosure is not limited to such example embodiments and/or implementations. Rather, the vanes, assemblies, and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A vane comprising an airfoil body extending from a root to a tip defining a longitudinal axis therebetween,
- wherein the airfoil body includes a leading edge between the root and the tip,
- wherein the airfoil body includes a pressure side and a suction side and a recess area on the leading edge,
- wherein the recess area includes a pressure side recess area having a pressure side base surface forming a straight edge and a suction side recess area having a suction side base surface having a curved edge, wherein the pressure side base surface meets the suction side base surface, a deposited metal on the recess area, wherein the deposited metal in the recess area has a thickness of 0.001 inch (0.03 mm) to 0.015 inch (0.4 mm); and wherein the airfoil body is made of a metal having a density equal to or less than a density of the deposited metal.

2. The vane of claim 1, wherein the deposited metal is directly on the recess area.

3. The vane of claim 1, wherein an outer surface of the deposited metal on the recess area is flush with an outer surface of the airfoil body.

4. The vane of claim 1, wherein the deposited metal comprises aluminum, copper, nickel, titanium, iron, chromium, or a combination thereof.

5. The vane of claim 1, wherein the deposited metal on the suction side recess area has a surface roughness of less than or equal to 40 microinches for the arithmetic average roughness (Ra).

6. The vane of claim 1, wherein the airfoil body further comprises a fiber-reinforced composite material.

7. The vane of claim 1, wherein an exposed surface area of the deposited metal on the suction side recess area is greater than an exposed surface area of the deposited metal on the pressure side recess area.

8. The vane of claim 1, wherein the recess area has a variable thickness or a uniform thickness.

9. The vane of claim 1, wherein the recess area has a thickness of one of: (i) 0.012 inch (0.3 mm); and (ii) 0.010 inch (0.25 mm).

10. The vane of claim 1, wherein a shape of the suction side recess area comprises a suction side edge and the suction side edge is parallel to the leading edge.

11. The vane of claim 1, wherein a shape of the pressure side recess area comprises a pressure side edge and the pressure side edge is parallel to the leading edge.

12. The vane of claim 1, wherein at least one of a suction side edge and a pressure side edge is not parallel to the leading edge.

13. The vane of claim 1, wherein the pressure side recess area comprises a pressure side edge wall and the suction side recess area comprises a suction side edge wall, an angle between the pressure side edge wall and the pressure side base surface and an angle between the suction side edge wall and the suction side base surface are different.

14. A gas turbine engine comprising the vane of claim 1.

15. The gas turbine engine of claim 14, wherein the recess area of the vane is shaped to increase a stiffness of the vane to tune a frequency of the gas turbine engine.

* * * * *